United States Patent
Reinhardt et al.

[11] Patent Number: 5,807,781
[45] Date of Patent: Sep. 15, 1998

[54] RELEASE BASE PAPER HAVING SILICATE-CONTAINING PRIMER COATS

[75] Inventors: Bernd Reinhardt; Volker Viehmeyer; Michael Hottenträger, all of Osnabrück, Germany

[73] Assignee: Kammerer GmbH, Osnabrück, Germany

[21] Appl. No.: 503,971

[22] Filed: Jul. 19, 1995

[30] Foreign Application Priority Data

Jul. 21, 1994 [DE] Germany .......................... 44 25 737.6

[51] Int. Cl.⁶ .................. B32B 9/04; B32B 29/00
[52] U.S. Cl. .......................... 428/341; 428/342; 428/409; 428/537.7; 428/543; 428/911
[58] Field of Search .................. 428/332, 339, 428/341, 342, 409, 537.5, 537.7, 543, 911

[56] References Cited

U.S. PATENT DOCUMENTS

| | | | |
|---|---|---|---|
| 2,526,787 | 10/1950 | Wiley | 428/342 |
| 3,403,045 | 9/1968 | Erickson et al. | 428/342 |
| 3,508,952 | 4/1970 | Eykamp et al. | 428/342 |
| 3,620,801 | 11/1971 | O'Grady | 428/342 |
| 4,151,344 | 4/1979 | Doss et al. | 528/34 |
| 5,082,724 | 1/1992 | Katsura et al. | 428/303 |
| 5,084,347 | 1/1992 | Kuhnhauser-Buch et al. | 428/342 |
| 5,141,789 | 8/1992 | Matsuzawa et al. | 428/40 |
| 5,318,815 | 6/1994 | Newing et al. | 428/40 |

FOREIGN PATENT DOCUMENTS

| | | | |
|---|---|---|---|
| 396 789 B1 | 12/1992 | European Pat. Off. | D21H 19/82 |
| 399 079 B1 | 8/1994 | European Pat. Off. | D21H 19/32 |
| OS 22 37 551 | 2/1973 | Germany | C08G 47/02 |

OTHER PUBLICATIONS

Special Volume of the 15th Munich Adhesive and Upgrading Seminar, 1991, pp. 20–28.

"Das Papier", 1992, No. 6, pp. 273–276.

*Primary Examiner*—H. Thi Le
*Attorney, Agent, or Firm*—Nutter, McClennen & Fish, LLP

[57] ABSTRACT

A release base paper having silicate-containing primer coats based on potassium or sodium waterglass, due to which the penetration of subsequent coatings comprising aqueous, solvent-containing or solvent-free silicone systems into the texture of the paper is decreased and a reduction in the silicone requirement in order to achieve predetermined release forces is thereby achieved.

17 Claims, No Drawings

RELEASE BASE PAPER HAVING SILICATE-CONTAINING PRIMER COATS

FIELD OF THE INVENTION

In order to produce what are termed release papers having dehesive properties in relation to adhesive layers, paper is provided with a silicone layer. In order to impart a certain surface impermeability to the paper and thereby to prevent the penetration of the silicone coating into the paper, release base papers which as yet have no silicone coating are treated with customary impregnating or surface sizing media. Depending on the type, concentration, temperature and viscosity of these media, a pure surface covering of the paper or partial penetration of the coating materials into the paper is obtained.

Furthermore, it is known that pigment/binder combinations such as kaolin, French chalk or calcium carbonate, as well as binders predominantly comprising polymer dispersions, can be applied to release base papers. The term "release base paper" is usually understood to mean papers on which a dehesive silicone coating has not yet been formed.

Despite covering the surface of release base papers, however, the partial penetration of aqueous silicone resins, and solvent-free silicone resins in particular, into the base paper cannot be prevented, due to their low molecular weights (Special Volume of the 15th Munich Adhesive and Upgrading Seminar, 1991, pages 20–28).

The proportion of solvent-free silicone resin which penetrates into the texture of the paper and is thereby lost as regards the sought-after dehesive effect of the silicone film to be formed can amount to up to 20%. For solvent-free silicone systems, coatings of about $1 \text{ g/m}^2 \pm 0.2 \text{ g/m}^2$ are thus generally required in order to obtain satisfactory dehesive properties in relation to most adhesive systems (minimum requisite amount of silicone coating).

The possibility of completely preventing the penetration tendency of silicone resins during the coating of paper and thereby obtaining an impermeable silicone film having a high dehesive effect using the minimum possible coating of silicone is therefore of particular economic interest. The fine pores on the surface of the paper need to be completely filled for this purpose, however. Sealing of the paper surface in this manner must not impair the anchoring of the silicone film to the paper surface, however.

PRIOR ART

Processes and coating formulations are known which substantially correspond to the last-mentioned objective. Thus in EP 396 789 B1 the adhesion of the paper to the silicone film is improved by the addition of up to 25% by weight of aqueous catalyst emulsions to the usual surface preparations for release base papers. In contrast, EP 399 079 A1 describes the positive effect on the rate of crosslinking of the silicone film to be formed of up to 20% (calculated as solids) of adding organic silicon additives (organosiloxanes or organopolysiloxanes) to the usual surface preparations for release base papers. These additives are relatively expensive, however. Moreover, no reduction of the minimum amount of silicone coating required is thereby achieved; this was not even intended in these two patent specifications.

DE-OS 22 37 551 describes the addition of $SiO_2$ hydrosol to organosiloxanes and diorganopolysiloxanes in an $Na_2O/SiO_2$ ratio of 1.0:3.2 as a dehesive coating for paper. In this respect, sodium silicate (waterglass) constitutes an inexpensive siloxane extender in the manufacture of organosilicon polymers. The proportion of waterglass in the mixture is about 25% by weight.

SUMMARY OF THE INVENTION

The object of the present invention is to provide release papers having a relatively inexpensive coating, which papers have an almost impermeable paper surface and which thereby make it possible to decrease or even to prevent the penetration of silicone resins, the object at the same time being to obtain good adhesion between the paper surface and a silicone film.

The present invention provides a release base paper for coating with a dehesive silicone coating, wherein a waterglass coat is formed on the paper. This type of surface sealing of release base papers results in a saving of silicone resin, particularly for solvent-free and aqueous systems, whilst the dehesive properties of the finished release paper remain the same. According to a preferred embodiment, the waterglass coat contains film formers based on polymeric solutions or dispersions. Suitable film formers include polyvinyl alcohols, starch derivatives, carboxymethyl celluloses or alginates, aqueous polymer dispersions based on acrylic acid, acrylic acid esters, acrylonitrile, vinyl acetate, butadiene and styrene, and aqueous solutions of copolymers based on maleic anhydride and maleic acid with styrene, acrylic acid and acrylic acid esters and/or on plasticizers with strongly hygroscopic properties such as ethylene glycols and glycerine. By the addition of these film formers the physicochemical properties of the surface preparations can be altered and the surface films formed can be modified as regards their stiffness, surface impermeability and resistance to ageing. These additives are preferably added to the waterglass in an amount of up to 30% (calculated as solids) and are preferably contained in such an amount in the waterglass coat.

According to a preferred embodiment the waterglass coat is formed on the paper at a thickness corresponding to 0.5 to $3 \text{ g/m}^2$, wherein surface-sized papers may also advantageously be used for this purpose.

The term "waterglass" is to be understood to comprise water-soluble potassium and sodium silicates or aqueous solutions thereof. Waterglass is commercially available with a solids content of 30 to 50% by weight. The chemical and physical properties of waterglass in the form of a mixture of alkali polysilicates of substantially straight chain structure is essentially determined by the molar ratio of $SiO_2$ to alkali oxide. "Waterglass" is defined in Chambers Dictionary of Science and Technology as a concentrated and viscous solution of sodium or potassium silicate, used as an adhesive, binder or a protective coating.

It has surprisingly been ascertained that the negative properties of waterglass in paper processing, namely the impairment of brightness stability due to the high pH of $\geq 10.5$ and the increasing brittleness with increasing additions of waterglass, can substantially be suppressed by means of suitable processing and chemical possibilities during surface coating. According to the invention, application of the waterglass coat is effected by what is termed thin coat technology, in which extremely thin coats of 1 to 3 $\text{g/m}^2$, and preferably less than $1.5 \text{ g/m}^2$, of substances which initially are reactive substances only, and which are based on organophilic layer silicates, are deposited on the support paper. This process is described in "Das Papier" ["Paper"], 1992, No. 6, pages 273–276, the disclosure of which is referred to as regards the deposition process.

Suitable coating apparatuses include multiple smooth roller and grid roller coating installations (reverse gravure, cumulative gravure and variable gravure processes), roller coating installations with volumetric pre-metering (gate role and blade metering film presses) or blade coating units with a premetering device (high special metering technique such as Billblade, HSM, LAS, HSM and twin HSM). These coating apparatuses are based on the direct or indirect film transfer technique, which enables very thin coats to be applied to the surface in accurately metered amounts—with partial penetration of the surface preparation into the texture of the paper substantially being ruled out.

Even porous base papers can be coated with waterglass by these methods, wherein waterglass on its own or in admixture with film formers can substantially seal the pores of the base paper.

It is advantageous if the surface preparations according to the invention are applied in a second coating operation inside the paper machine (outer layer) to a release base paper which has already been surface-sized as described in the prior art (base coat), in order to obtain an almost impermeable paper surface with excellent barrier properties in relation to silicone resins using low amounts of coating of <1.5 g/m$^2$, or as far as possible <1.0 g/m$^2$.

It is possible to dispense with a base coat, however, wherein the outer coat should then be applied at up to 3 g/m$^2$ in order to obtain a comparable surface impermeability of the base paper.

The present invention also relates to a release paper which has a waterglass primer coat as described above, on which a silicone coating is formed in order to impart dehesive properties. The release paper is preferably surface-sized and the amount of silicone coating is preferably about 0.5 to 0.9 g/m$^2$.

Suitable organic silicone polymers with dehesive properties are known to one skilled in the art. For example, they comprise chain dimethylpolysiloxanes with terminal hydroxyl groups which are condensed with silicic acid esters under the effect of elevated temperature and in the presence or organotin salts as a catalyst, or which are obtained by the addition crosslinking route by the reaction of chain polymers containing vinyl terminal groups with hydrogen siloxanes under the effect of temperature in the presence of platinum catalysts. The aforementioned application methods can be used for coating the paper substrate.

DESCRIPTION OF PREFERRED EMBODIMENTS

The invention will now be described in more detail with reference to examples.

EXAMPLE 1

Surface preparations of the composition given in Table 1 were applied at a coating amount of 1 g/m$^2$ (calculated as solids) to a release base paper with a weight per unit surface of 67 g/m$^2$, which was not surface-sized, using a laboratory sizing press.

These base papers, which were coated in the laboratory and subsequently dried, were calendered, after re-moistening, in a double-roll laboratory calender under conditions approximating those used in practice, and were then tested. The test results are summarised in Table 2.

Thereafter the surface impermeability of the papers, expressed as the porosity and as the oil and water absorption, was impaired even by small additions of waterglass (1 to 5%, calculated as solids) to the standard formulation (PVA/CMC). The heat-resistance also decreased with increasing additions of waterglass (see the drop in brightness).

Accordingly, the sought-after improvement in surface impermeability of release base papers which are not surface-sized cannot be obtained using 1 g/m$^2$ base coats which only contain small proportions of waterglass.

A surface impermeability of the papers which was almost identical to that of the reference paper (No. 1, 1 g/m$^2$ coat application) was not obtained until amounts of coating were used which were greater than 2.5 to 3 g/m$^2$.

An improvement in surface impermeability (porosity, oil absorption) of the release base papers was not obtained until a pure waterglass coat was applied to a release base paper which was surface-sized in the paper machine (see Table 3, No. 5 compared with No. 4 [standard]). In addition to the aforementioned impaired heat-resistance, an increased stiffness of the treated paper was also obtained due to the waterglass film.

EXAMPLE 2

In a further series of tests a standard release base paper with a weight per unit surface of 60 g/m$^2$ which had already been surface-sized in the paper machine was provided with different 1 g/m$^2$ outer coats according to the formulations given in Table 4. After carrying out subsequent treatment analogously to Example 1 the papers were tested. The results are given in Table 5.

As shown by the results, no significant change in surface impermeability as regards porosity and oil absorption was observed compared with the pure waterglass coat (No. 6) on the addition of up to 30% (calculated as solids) of various polymers to potassium waterglass. In contrast, the addition of polymers had a positive effect on smoothness, microroughness, gloss and heat-resistance, particularly when using plasticizers such as polyethylene glycol (Nos. 7 to 9), polyvinyl alcohol (Nos. 7 to 12) or a mixture of maleic anhydride and styrene-butadiene copolymer (Nos. 13 to 15). Similar improvements in quality were likewise obtained by the admixture of other water-soluble polymers such as starch, carboxymethyl cellulose, starch derivatives and other aqueous polymer dispersions such as acrylic acid copolymers.

A further positive effect was the increase in flexibility of the surface films due to these polymer additions, which was manifested not only by an increase in smoothness due to calendering but also by films which appeared substantially crack-free under the scanning electron microscope.

EXAMPLE 3

An uncalendered standard release base paper which had been surface-sized on both sides, with a weight per unit surface of 60 g/m$^2$, was coated on one side with different sodium waterglass solutions in a separate operation by means of grid rollers (papers B, C). The amount of coating was less than 1 g/m$^2$ (calculated as solids). The papers which were coated according to the invention in this manner were then calendered in a 16-roll super calender.

An improvement in surface impermeability (porosity, oil absorption) was obtained compared with a standard release base paper without the outer coat according to the invention, which was surface-sized on both sides and calendered (paper A). On the other hand, the surface roughness increased (see the PPS values, Bekk smoothness), just as the thermal yellowing did for paper B. However, this impairment of some paper properties did not have a negative effect on the dehesive effect of siliconized papers, as will be verified later. The results are summarised in Table 6.

Test papers A, B and C were then coated with a solvent-free standard silicone system in an installation at a college of technology, under conditions approximating to those used in practice (5 roll coating installation, 300 m/min). The silicone coating was varied between 0.5 g/m² and 0.9 g/m².

The impermeability of the silicone films applied was determined by means of various colour reagents. The results are given in Table 7.

The lower the colorimetric measure is, the more impermeable is the silicone film formed, and the dehesive effect in relation to adhesives should accordingly be greater in proportion. At approximately comparable silicone weights of 0.8 to 0.9 g/m², the colorimetric measures determined on papers B and C according to the invention are significantly lower than for standard paper A, irrespective of the colour reagent used, with one exception (methylene blue).

Even when the silicone coating is reduced to about 0.5 g/m², the colorimetric measures (again with the exception of methylene blue) are still lower than for the standard paper with an 0.9 g/m² silicone coating. In general, the papers of test series B exhibited somewhat lower colorimetric measures than the papers of test series C, presumably due to an increased application of waterglass.

The dehesive properties of the siliconized papers were then determined by means of release force measurements using test adhesive strips. The results are given in Table 8 (low speed measurements). The lower the release force values, the greater are the dehesive properties of the silicone-coated paper. Experience in general has shown that the results of low speed measurements are generally more reliable than values measured at high speed. This applies in particular when differentiations have to be made between various silicone surfaces.

In practice, natural rubber test adhesive strip K 7476 is often utilized for assessing the release properties of siliconised papers. A comparison of the measured values (see Table 8) confirms the better dehesive properties of test papers B and C, which had a waterglass outer coat according to the invention, compared with test paper A (standard).

Analogous results were also obtained when using rubber test adhesive strip 154. In this comparison also, the papers of test series B were again assessed to be somewhat more beneficial than those of test series C. This also applies to the high speed measurements (see Table 9).

Surprisingly, test paper B 3, which had a very low silicone coating of only 0.5 g/m², exhibited the lowest release values.

Without overrating these measured values, it can be concluded from them that the release base papers according to the invention with an outer coat containing waterglass have a significantly improved "silicone hold out", which can be utilized in order to reduce the silicone coating by at least 20% whilst maintaining the predetermined level of release force.

TABLE 1

Surface sizing formulations
- Example 1 -
Data in parts by weight

| Formulation | Starch derivative | Polyvinyl alcohol (PVA) | Carboxymethyl cellulose (CMC) | Sodium waterglass $SiO_2/Na_2O$ = 3.70–3.90 |
|---|---|---|---|---|
| A (standard) | — | 80 | 20 | — |
| B | — | 79 | 20 | 1 |
| C | — | 75 | 20 | 5 |
| D | 65 | 35 | — | — |
| E | — | — | — | 100 |

Concentration: 3.5% (formulations A to C); 4.5% (formulations D and E)
pH: ≧ 10.0

TABLE 2

Physical properties of surface-sized papers (calendered)
- Example 1 -

| Ser. No. | Coating variants (see Table 1) Base coat about 1 g/m² | SCAN porosity (cm³/ m² · s) | Bekk smoothness s | Oil absorption (Cobb-Rizinius) g/m² | Water absorption (Cobb-Unger) g/m² | Brightness before/after the effect of heat (180° C., 30 s) % | Difference in brightness % |
|---|---|---|---|---|---|---|---|
| 1 | Formulation A (standard) | 36 | 899 | 0.54 | 20.6 | 65.8/57.9 | 7.9 |
| 2 | Formulation B | 73 | 924 | 0.62 | 21.5 | 65.4/57.1 | 8.3 |
| 3 | Formulation C | 134 | 886 | 0.88 | 24.5 | 65.0/55.9 | 9.1 |

TABLE 3

Physical properties of surface-sized papers (calendered)
- Example 1 -

| | Coating variations (see Table 1) | | SCAN Porosity | Bekk smoothness | Oil absorption (Cobb-Rizinius) | Brightness before/after the effect of heat | Difference in brightness | Longitudinal stiffness |
|---|---|---|---|---|---|---|---|---|
| Ser. No. | Base coat about 1 g/m² | Outer coat about 1 g/m² | (cm³/m²·s) | s | g/m² | (180° C., 30 s) % | % | mN |
| 4 | Formulation D (standard) | — | 336 | 1220 | 1.58 | 6.69/58.7 | 8.1 | 62 |
| 5 | Formulation D | Formulation E | 203 | 1290 | 1.40 | 65.8/56.6 | 9.2 | 65 |

TABLE 4

Surface sizing formulations
- Example 2 -
Data in parts by weight

| Ser. No. | Formulation | Potassium waterglass SiO₂/K₂O = 2.50–2.60 | Polyethylene glycol | Polyvinyl alcohol | Mixture of polymer solution and dispersion[1] |
|---|---|---|---|---|---|
| 6 | E | 100 | — | — | — |
| 7 | F1 | 90 | 10 | — | — |
| 8 | F2 | 80 | 20 | — | — |
| 9 | F3 | 70 | 30 | | |
| 10 | G1 | 90 | — | 10 | — |
| 11 | G2 | 80 | — | 20 | — |
| 12 | G3 | 70 | — | 30 | — |
| 13 | H1 | 90 | — | — | 10 |
| 14 | H2 | 80 | — | — | 20 |
| 15 | H3 | 70 | — | — | 30 |

Concentration: 5%
pH: ≧ 10.0
[1] Maleic anhydride/styrene/butadiene copolymer = 1:10 (calculated as solid)

TABLE 5

Physical properties of surface-sized papers (calendered)
- Example 2 -

| Ser. No. | Outer coat about 1 g/m² with formulation (see Table 4) | Bekk smoothness s | Micro-roughness (PPS) μm | 75° gloss % | Oil absorption (Cobb-Rizinius) g/m² | Brightness before/after effect of heat (180° C., 30 s) | Difference in brightness % |
|---|---|---|---|---|---|---|---|
| | Standard base paper (surface-sized) | 1060 | 2.3 | 41.4 | 0.63 | 65.0/56.0 | 9.1 |
| 6 | E | 1160 | 2.1 | 47.8 | 0.31 | 63.7/50.9 | 12.8 |
| 7 | F1 | 1280 | 1.9 | 47.8 | 0.41 | 64.3/55.2 | 9.1 |
| 8 | F2 | 1100 | 2.1 | 46.7 | 0.35 | 64.7/56.2 | 8.5 |
| 9 | F3 | 1120 | 2.0 | 47.7 | 0.38 | 64.7/56.4 | 8.3 |
| 10 | G1 | 1280 | 2.1 | 47.7 | 0.30 | 64.3/56.0 | 8.3 |
| 11 | G2 | 1230 | 2.0 | 48.0 | 0.31 | 64.4/56.3 | 8.1 |
| 12 | G3 | 1270 | 2.1 | 50.4 | 0.30 | 64.4/56.2 | 8.2 |
| 13 | H1 | 1280 | 2.0 | 47.1 | 0.31 | 64.5/56.2 | 8.3 |
| 14 | H2 | 1600 | 2.0 | 49.6 | 0.29 | 64.9/56.7 | 8.2 |
| 15 | H3 | 1820 | 1.9 | 50.5 | 0.32 | 64.6/56.3 | 8.3 |

All papers had a SCAN porosity < 20 cm³/m².s

TABLE 6

Physical properties of surface-sized papers (calendered)
- Example 3 -

| Paper | Base coat (PVA/CMC) g/m² | Outer coat (waterglass) g/m² | SCAN porosity cm³/m².s | Micro-roughness (PPS) μm | Oil absorption (Cobb-Rizinius) g/m² | Bekk smoothness s | Brightness before/after effect of heat (180° C., 30 s) % | Difference in brightness % |
|---|---|---|---|---|---|---|---|---|
| A (standard) | about 1 each side | — | 76 | 1.9 | 0.9 | 1150 | 66.8/53.4 | 13.4 |
| B | about 1 each side | 0.9 ... 1.0[1)] | 40 | 2.2 | 0.6 | 675 | 65.1/46.8 | 18.3 |
| C | about 1 each side | 0.5 ... 0.6[2)] | 30 | 2.1 | 0.6 | 810 | 64.3/52.0 | 12.3 |

[1)]SiO₂/Na₂O weight ratio = 3.70–3.90 (concentration: 7%)
[2)]SiO₂/Na₂O weight ratio = 3.30–3.40 (concentration: 15%)

TABLE 7

Surface staining of siliconised papers
- Example 3 -

| | | Colorimetric measure Δ Y | | | |
|---|---|---|---|---|---|
| Paper | Silicone coating g/m² | Malachite green (30 s) | Methylene blue (60 s) | Neocarmine (120 s) | Shirlastain (120 s) |
| A (standard) | 0.87[x] | 16.2[x] | 13.3[x] | 20.8[x] | 14.3[x] |
| B1 | 0.77[x] | 4.6[x] | 12.4[x] | 12.2[x] | 9.4[x] |
| B2 | 0.66 | 6.3 | 18.6 | 14.4 | 11.4 |
| B3 | 0.49 | 10.2 | 24.5 | 18.8 | 14.4 |
| C1 | 0.87[x] | 6.6[x] | 13.8[x] | 12.5[x] | 9.0[x] |
| C2 | 0.79 | 8.2 | 17.7 | 15.7 | 10.5 |
| C3 | 0.54 | 14.8 | 26.8 | 20.2 | 14.2 |

[x] = approximate basis of comparison with respect to silicone coating

TABLE 8

Release properties of siliconised papers
(low speed release test)
- Example 3 -

| | | Release force | |
|---|---|---|---|
| Paper | Silicone coating g/m² | TESA 154 cN/4 cm | TESA K 7476 cN/2 cm |
| A (standard) | 0.87[x] | 13 | 43 |
| B1 | 0.77[x] | 11 | 34 |
| B2 | 0.66 | 10 | 35 |
| B3 | 0.49 | 11 | 29 |
| C1 | 0.87[x] | 11 | 37 |
| C2 | 0.79 | 13 | 41 |
| C3 | 0.54 | 14 | 48 |

[x] = approximate basis of comparison with respect to silicone coating

TABLE 9

Release properties of siliconised papers
(high speed release test)
- Example 3 -

| | | Release force (TESA 154), cN/4 cm Pull-off speed in m/min | | | |
|---|---|---|---|---|---|
| Paper | Silicone coating g/m² | 30 | 100 | 180 | 270 |
| A (standard) | 0.87[x] | 33 | 41 | 42 | 42 |
| B1 | 0.77[x] | 26 | 37 | 43 | 37 |
| B2 | 0.66 | 28 | 46 | 46 | 42 |
| B3 | 0.49 | 35 | 50 | 51 | 52 |
| C1 | 0.87[x] | 38 | 50 | 42 | 37 |
| C2 | 0.79 | 31 | 43 | 43 | 37 |
| C3 | 0.54 | 41 | 48 | 48 | 48 |

[x] = approximate basis of comparison with respect to silicone coating

What is claimed is:

1. A release base paper for coating with a dehesive silicone coating, wherein the release base paper includes a surface having a waterglass coat thereover in the range of about 2.5 to 3.0 g/m².

2. A release base paper according to claim 1, wherein said waterglass coat contains film-forming polymers.

3. A release base paper according to claim 1, wherein said waterglass coat contains film-forming polymers in an amount of up to 30% by weight, calculated as solids.

4. A release base paper for coating with a dehesive silicone coating, wherein the release base paper has a waterglass coat greater than about 2.5 g/m² and said waterglass coat contains water-soluble film-forming polymers selected from the group consisting of polyvinyl alcohols, starch derivatives, carboxymethyl celluloses, alginates, aqueous polymer dispersions and aqueous solutions of copolymers, wherein said aqueous polymer dispersions are selected from the group consisting of maleic anhydride, maleic acid with styrene, acrylic acid, and acrylic acid esters, and wherein said aqueous solutions of copolymers are selected from the group consisting of maleic anhydride, maleic acid with styrene, acrylic acid, acrylic acid esters, and plasticizers with hygroscopic properties.

5. A release base paper according to claim 4 wherein the are selected from the group consisting of ethylene glycols and glycerine.

6. A release base paper according to claim 4, wherein said waterglass coat contains said film-forming polymers in an amount of up to 30% by weight, calculated as solids.

7. A release base paper according to claim 4, wherein said waterglass coat has a thickness less than about 3 g/m².

8. A release base paper for coating with a dehesive silicone coating, the release base paper having a surface that has been sized with a sizing material, wherein a waterglass coat is present on the sized surface of said paper, the waterglass coating being present between about 0.5 g/m² and about 3.0 g/m².

9. The release base paper of claim 8 further comprising a silicone coating applied to the waterglass coat.

10. A release paper according to claim 9, wherein said waterglass coat contains film-forming polymers.

11. A release paper according to claim 9, wherein said waterglass coat contains said film-forming polymers in an amount of up to 30% by weight, calculated as solids.

12. The release base paper of claim 9 wherein the silicone coating is present in the range of about 0.5 to 0.9 g/m².

13. A release paper having a dehesive silicone coating, wherein the release paper has a surface having a waterglass coat greater than about 2.5 g/m² and the silicone coating is disposed on the waterglass coat, wherein said waterglass coat contains water-soluble film-forming polymers selected from the group consisting of polyvinyl alcohols, starch derivatives, carboxymethyl celluloses, alginates, aqueous polymer dispersions and aqueous solutions of copolymers, wherein said aqueous polymer dispersions are selected from the group consisting of maleic anhydride, maleic acid with styrene, acrylic acid, and acrylic acid esters, and wherein said aqueous solutions of copolymers are selected from the group consisting of maleic anhydride, maleic acid with styrene, acrylic acid, acrylic acid esters, and plasticizers with hygroscopic properties.

14. A release paper according to claim 13, wherein the plasticizer is selected from the group consisting of ethylene glycols and glycerine.

15. A release paper according to claim 13, wherein said waterglass coat contains said film-forming polymers in an amount of up to 30% with respect to solids.

16. A release paper according to claim 13, wherein said waterglass coat has a thickness less than about 3 g/m².

17. A release paper having a dehesive silicone coating, the release paper having a surface sized with a sizing material and a waterglass coat of between about 0.5 g/m² and about 3.0 g/m² disposed on the sized surface, wherein the silicone coating is formed on the waterglass coat of the release base paper.

* * * * *